Sept. 19, 1967     F. L. PELLIZZARI     3,342,512
CONDUIT BEND
Original Filed Feb. 5, 1962
2 Sheets-Sheet 1
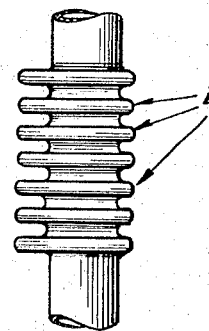
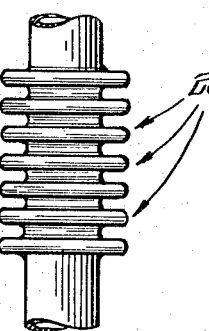
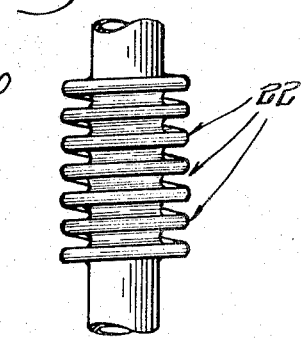
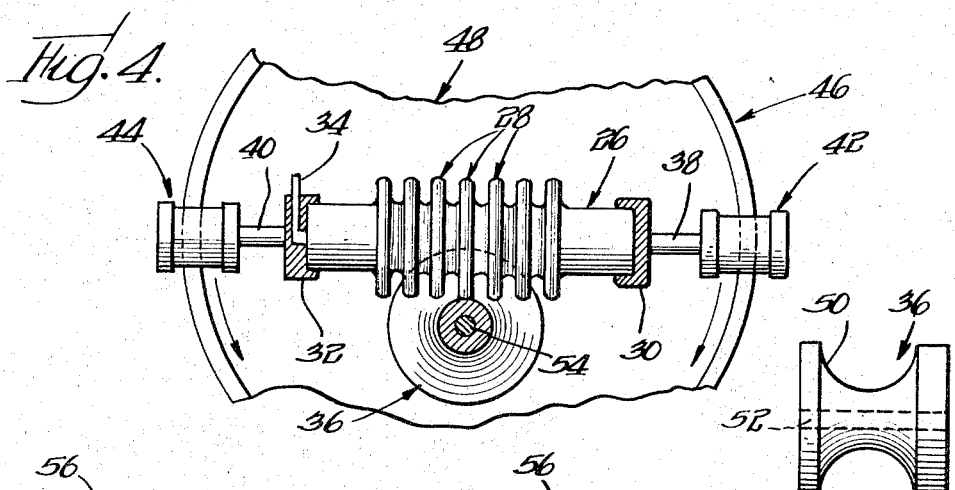
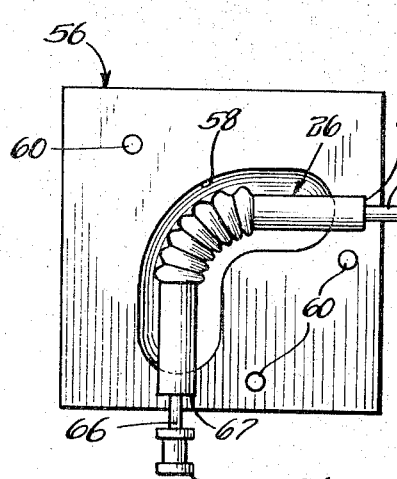
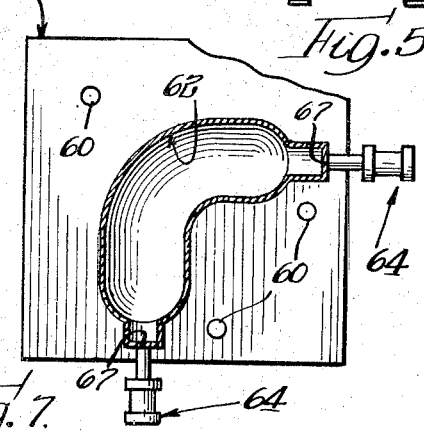
INVENTOR.
Frank L. Pellizzari
BY
Olson, Trexler
Wolters & Bushnell Attys.

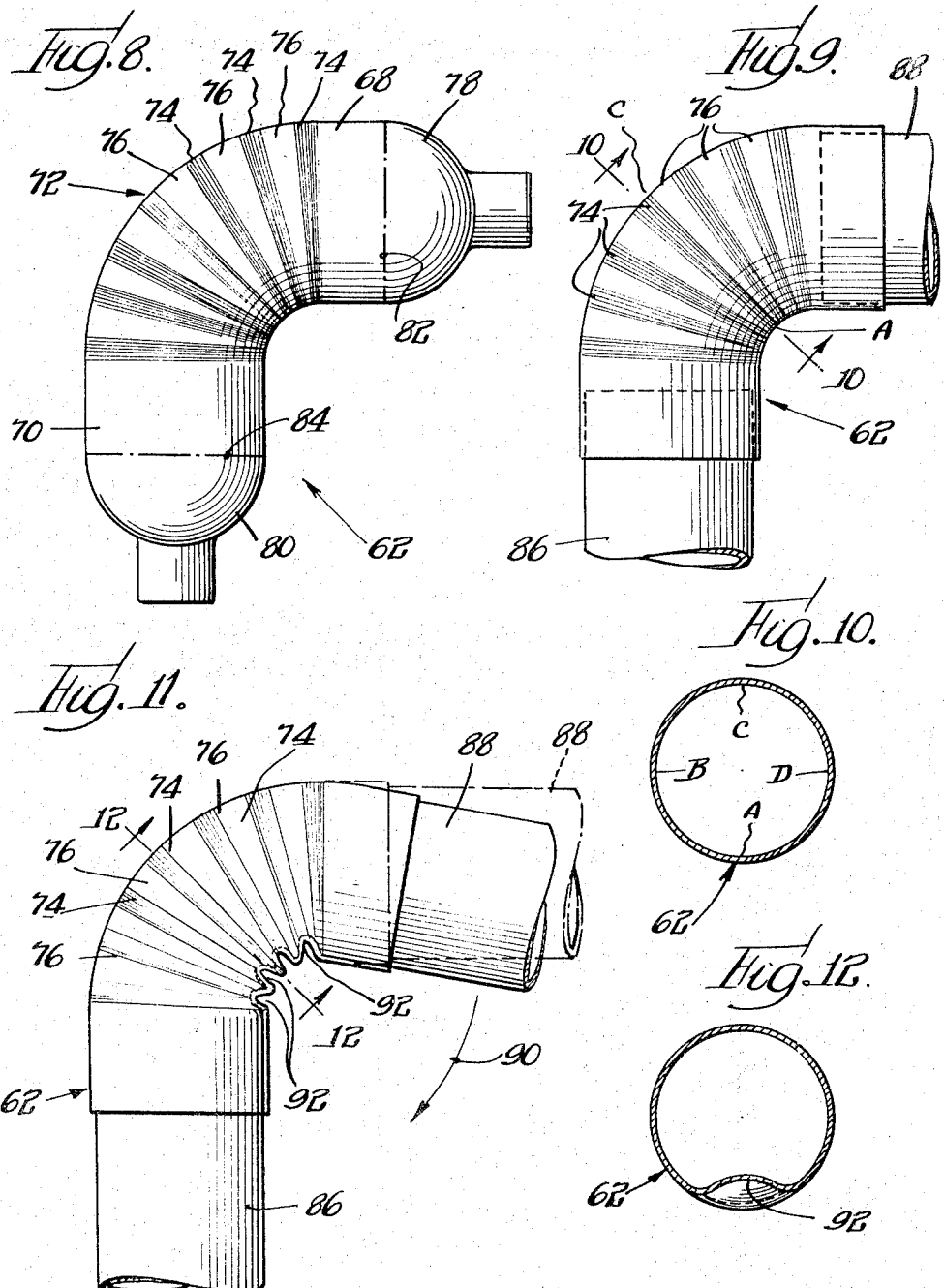

United States Patent Office 3,342,512
Patented Sept. 19, 1967

3,342,512
CONDUIT BEND
Frank L. Pellizzari, Bartlett, Ill., assignor to Calumet & Hecla, Inc., Evanston, Ill., a corporation of Michigan
Original application Feb. 5, 1962, Ser. No. 171,002, now Patent No. 3,247,581. Divided and this application Sept. 7, 1965, Ser. No. 485,259
1 Claim. (Cl. 285—183)

This is a division of my co-pending application, Serial No. 171,002, filed February 5, 1962, now Patent No. 3,247,581.

This invention relates generally to conduit systems and more particularly to elbows and to fittings of other shape for connecting lengths of conduit.

Bending thin walled conduit to form elbows and other fittings has always been a problem. For example, it is common practice to resort to an articulated, internal mandrel in producing a right angle bend in thin walled conduit when a sharp radius is involved, the use of the mandrel being necessary in order to prevent collapse of the wall of the conduit at the inner curve of the bend. Morover, the bending processes heretofore employed result in a stretching or thinning of the conduit wall at the outer curve of the bend and a concomitant compression, thickening or wrinkling of the conduit wall at the inner curve of the bend. This latter situation has required the ultimate use of fittings having excess weight due to the unnecessary material present in the conduit wall at the inner curve of the bend. Furthermore, bends and fittings of other shape have frequently been unavailable heretofore in large diameter units because of the frequent lack of bending machines and dies capable of handling such sizes of conduit.

Therefore, an important object of the invention is to provide novel conduit bends and fittings.

A yet further object of the invention is to provide conduit bends and other fittings which are more economical in use of material and lighter weight for a given service.

A still further object of the invention is to provide conduit bends and fittings of other shape which are stronger at the outer curve of the bend than at the inner curve thereof.

And a still further object of the invention is to provide conduit bends and fittings which are resistant to buckling along a single crease or fold upon subjection to bending forces.

And a still further object of the invention is to provide conduit bends and fittings which tend to form a number of creases or folds upon subjection to excessive bending force whereby to resist total failure of the unit.

Additional objects and features of the invention pertain to the particular structure, methods and arrangements whereby the above objects are attained.

The invention, both to its article and method aspects, will be better understood by reference to the following disclosure and drawings forming a part thereof, wherein:

FIG. 1 is an elevational view of a section of conduit which has been corrugated as a preliminary step to the production of a conduit bend, the section of conduit being particularly formed with eccentric corrugations;

FIG. 2 is an elevational view of a section of conduit formed with annular corrugations;

FIG. 3 is an elevational view of a section of conduit formed with helical corrugations;

FIG. 4 is an elevational view showing bending of a corrugated section of conduit as an intermediate step in the production of a conduit bend;

FIG. 5 is a side elevational view of the bending die used in the arrangement of FIG. 4;

FIG. 6 shows a previously corrugated and bent section of conduit placed in a forming die preparatory to the production of a conduit bend;

FIG. 7 shows the die and conduit section of FIG. 6 after the conduit section has been expanded into conformity with the shape of the die;

FIG. 8 is an enlarged, side elevational view of the expanded section of conduit taken from the forming die;

FIG. 9 shows the conduit bend of FIG. 8 with the ends removed to permit assembly of the conduit bend to straight lengths of conduit;

FIG. 10 is a view taken through the section 10—10 of FIG. 9;

FIG. 11 is a view similar to the showing of FIG. 9 illustrating failure of the conduit bend when subjected to excessive bending forces; and FIG. 12 is a view taken through the section 12—12 of FIG. 11.

Referring now in detail to the drawings, specifically to FIGS. 1–7, a conduit bend fashioned in the shape of an elbow is seen to be produced by the successive steps of forming corrugations in a selected length of a tubing element, bending the element at some desired angle in the vicinity of the corrugations and thereafter radially expanding the bent and corrugated element in a confining die to smooth out the corrugations and establish the finished shape. As is shown in FIGS. 2 and 3, the corrugations initially formed in the tubing element may take the form of annular corrugations 20 or helical corrugations 22; however, the eccentric corrugations 24 shown formed in the tubing element of FIG. 1 have proved especially advantageous. The tubing element employed as a starting component for the instant invention may comprise seamless, butt welded or any other commercially available tubing or conduit; and both ferrous and non-ferrous materials may be utilized, the present invention being particularly useful for the production of stainless steel conduit bends and fittings. Moreover, the corrugations initially formed in the tubing element may be produced therein by any of the well known commercial methods.

After the corrugations have been formed in the tubing element, the element is annealed; and thereafter, it is bent at a suitable angle in the vicinity of the corrugations whereupon it is again annealed.

Turning to FIG. 4, a tubing element 26 having annular corrugations 28 formed therein will be seen disposed with its ends gripped by fittings 30 and 32. The fitting 32 incorporates a hydraulic inlet passageway 34 for purposes of passing pressurized hydraulic fluid to the interior of element 26. Thus, element 26 can be subjected to internal pressure at the same time that it is being bent about a die 36.

The end fittings 30 and 32 are connected to shafts 38 and 40 respectively; and these shafts are, in turn, fastened to the pistons of hydraulic motors 42 and 44 respectively. A circular track 46 is mounted on a base 48; and the cylinders of motors 42 and 44 are arranged to ride on the track 46 to be driven in converging directions for purposes of bending the tubing element 26 about the center die 36, die 36 being mounted on the base 48. Because the cylinders of motors 42 and 44 are fixed against radial movement relative to the track 46, hydraulic actuation of the pistons of the respective motors can be directed to subject the tubing element 26 to axial, tensile loading simultaneously with the bending operation in order to form a proper bend in the tubing element. It is recognized that tensile loading of the tubing element 26 can be alternatively achieved in conjunction with subjection of the element to internal pressure by closing off the opposite, open ends of the tubing element with discs welded in place, the internal pressure forces acting perpendicular to these end discs supplying certain axial, tensile loading of the element.

With reference to FIG. 5, the bending die 36 will be seen fashioned in the shape of a spool-like member defining an annular, semi-toroidal cavity 50 for receiving the corrugated tubing element, die 36 having a central bore 52 for receiving a shaft 54, as shown in FIG. 4, in the mounting of the bending die to the bore 48.

When eccentrically corrugated tubing is employed, it is advantageous to bend the tubing element with the deeper side of the eccentric corrugations disposed at the outside curve of the bend.

After the tubing element 26 has been bent at an appropriate angle, it is placed in a forming die as is shown in FIG. 6. There, one-half of a split die is indicated by the numeral 56. The die 56 is hollowed with one-half of an angulated, smooth walled cavity 58 and is drilled with the surface of the die cavity whereby to smooth aligning the mating die halves. The cavity 58 is fashioned in the shape which it is desired to have the completed fitting take. Moreover, that portion of the tubing element 26 which is confined in the cavity 58 is advantageously arranged to possess a surface area which is somewhat less than the surface area of the cavity. In one specific embodiment, it has proved useful to select the confined surface area of the tubing element to be from 85–95% of the surface area of the cavity.

After the tubing element 26 has been positioned with respect to cavity 58 and after the halves of the forming die have been closed and clamped together under suitable pressure, the previously corrugated and bent tubing element 26 is expanded radially with respect to its own central axis so that the wall of the tubing element conforms with the surface of the die cavity whereby to smooth out the previously formed corrugations and whereby to generate the ultimately desired shape of the tubing element. The tubing element so formed is indicated in FIG. 7 by the numeral 62.

Advantageously, hydraulic pressure is employed in radially expanding the previously bent and corrugated tubing element in the forming die; and the necessary hydraulic fluid may be introduced into the interior of tubing element 26 by one or more pumps 64 which are communicated with the interior of the tubing element by conduits 66 which conduits are joined to end discs secured in the ends of the tubing element as by being welded in place. Alternatively, pressurized hydraulic fluid can be introduced into the tubing element 26 by end fittings such as the end fittings 30 and 32 used in the bending operation illustrated in FIG. 4. In addition, it has been proved valuable to expand the tubing element while maintaining the ends of the tubing element under axial, tensile loading; and this loading can be achieved by suitable mechanical means or by utilizing the axial component of the internal hydraulic pressure as exerted on the end discs when such are provided.

The conduit bend or fitting 62 which is produced by the above-described method has been found to be smooth and substantially free of wrinkles and to possess a relatively uniform wall thickness, as much as 75% more uniform than similar conduit bends and fittings heretofore available. Furthermore, the above-described method permits the production of large diameter fittings in a simple easy manner and without the need for articulated, internal mandrels and other complex mechanisms heretofore employed.

Turning to FIG. 8 for a more detailed description of the article produced by the above method, the conduit bend 62 will be seen to comprise a pair of tubular sections of conduit, sections 68 and 70 respectively. These sections 68 and 70 are integrally and successively connected in angulated relationship as by being formed from a single piece of tubing. The sections 68 and 70 may be considered to be integrally joined at oppositely canted ends to form a bend 72; and in accordance with the present invention, the tubing sections 68 and 70 define a plurality of alternatively arranged wall portions, specifically the series of wall portions 74 and the series of wall portions 76. The annular wall portions 74 and 76 are arranged to incorporate vestigial stresses for purposes which will become more apparent hereinafter.

The conduit bend 62, as produced, also comprises end sections 78 and 80; and in order to prepare the bend for use, the end sections 78 and 80 are severed from the sections 68 and 70 along planes indicated at 82 and 84 respectively. After the end sections 78 and 80 have been removed, the conduit bend 62 can be assembled to lengths of conduit in the creation of a conduit system. As shown in FIG. 9, straight lengths of conduit 86 and 88 are fitted into the opposite ends of the bend 62 to be welded or otherwise suitably secured in place.

Regardless of the care and attention devoted to the installation and maintenance of a conduit system, occasions do arise when a bend, elbow or other fitting is subjected to excessive bending stresses. In FIG. 11, a situation of this type is illustrated wherein the conduit 88 has been accidentally displaced in the direction of arrow 90 with such force as to cause at least partial failure in the fitting 62. In ordinary fittings, excessive bending forces of this character tend to cause buckling or collapse of the fitting by the incurrence of a single large fold emanating radially inwardly from the inner curve of the bend. However, it will be seen that the conduit bend 62 of the invention tends to distribute the stress among the several annular wall portions 74 and 76 resulting in the formation of a number of circumferential or peripheral pleats or wrinkles 92; and while this plurality of wrinkles tends to obstruct flow through the fitting, the total reduction in cross-section of the fitting thus incurred is substantially less than it would be if a single fold were to result from the excessive bending forces. Thus, the conduit bend of the present invention is capable of accepting excessive bending forces with reduced effectiveness but not total failure. Consequently, accidental bending of the fitting does not create an emergency situation requiring immediate attention.

The vestigially stressed, annular wall portions 74 and 76, as will be observed from an inspection of FIG. 10, do not define ripples or undulations in the surface of the finished fitting and accordingly do not interfere with the flow of materials through the fitting as by inducing turbulence.

In accordance with another important feature of the invention, the conduit bend or fitting 62 incorporates progressively greater strength from the inner portion of the curve to the outer curve. It is a well known fact that the outer regions of a conduit bend are subjected to greater stresses in use than the corresponding inner regions; and therefore, since the strength of the fitting of the present invention is greatest where the most strength is needed, the fitting need not be encumbered with excessive strength and excessive amounts of material at the inner curved region of the bend. Hence, fittings of the invention can be made more economical and lighter in weight for a given service.

In one specific embodiment of the invention, tubing was fashioned from type 321 stainless steel to possess an inside diameter of 5.5 inches. Initial wall thickness was 0.025 inch. This tubing was then formed into a fitting in compliance with the invention, and longitudinal samples were taken in the regions indicated by the letters A, B, C and D in FIG. 10. The following metallurgical data was developed from the test specimens:

| Region | Wall Thickness (inches) | Ultimate Tensile Strength (p.s.i.) | Yield Strength (p.s.i.) |
|---|---|---|---|
| A | 0.0200 | 82,700 | 42,600 |
| B | 0.0143 | 111,400 | 92,500 |
| C | 0.0135 | 113,600 | 98,300 |
| D | 0.0140 | 110,200 | 92,100 |

From an inspection of the above data, it will become apparent that both the tensile and yield strength of the conduit bend of the invention is greater at the outer portion of the curve, "Region C," than elsewhere about the circumference at the plane of the bend of the fitting.

The manner in which the present invention may be practiced and the purposes to which it may be put are evident from the foregoing descriptions.

While particular embodiments of the invention have been shown, it should be understood, of course, that the invention is not limited thereto since many modifications may be made; and it is, therefore, contemplated to cover by the appended claim any such modifications as fall within the true spirit and scope of the invention.

The invention is claimed as follows:

A fitting adapted to connect two conduits disposed at an angle with respect to each other, said fitting comprising an integral conduit comprised of a plurality of substantially smooth-walled, tubular sector shaped sections stressed in tension and compression successively arranged in angulated relationship to define at least one bend, said fitting formed from said plurality of tubular sections having substantially continuous smooth inner and outer surfaces, each of said tubular sections including a first and a second plurality of annular wall portions coadunated in alternate relationship, said first plurality of wall portions having different, circumferential, continuous vestigial stresses than said second plurality of wall portions, said fitting being so constructed and arranged that if excessive inward bending occurs said first plurality of wall portion having said vestigial stresses forms a plurality of folds in the inner wall of the bend, said fitting having progressively greater tensile and yield strengths measured from the inner curve to the outer curve of the juncture between said sections and the wall sections of said fitting at regions of relatively greater tensile and yield strength being at least no thicker than wall sections of relatively lesser tensile and yield strength.

References Cited
UNITED STATES PATENTS

| | | | |
|---|---|---|---|
| 133,989 | 12/1872 | Hoeller | 285—183 |
| 164,872 | 6/1875 | Piehl | 285—183 |
| 500,119 | 6/1893 | Dieckmann | 285—183 |
| 540,584 | 6/1895 | Dieckmann | 285—424 X |
| 925,242 | 6/1909 | Steinwand | 285—183 X |
| 1,617,277 | 2/1927 | Schmidt | 285—179 X |
| 1,960,577 | 5/1934 | Snyder | 285—179 |
| 2,066,775 | 1/1937 | Fritsch | 285—179 |
| 2,837,810 | 6/1958 | Ekholm | 285—177 X |

CARL W. TOMLIN, *Primary Examiner.*

D. W. AROLA, *Assistant Examiner.*

UNITED STATES PATENT OFFICE
CERTIFICATE OF CORRECTION

Patent No. 3,342,512                      September 19, 1967

Frank L. Pellizzari

It is hereby certified that error appears in the above numbered patent requiring correction and that the said Letters Patent should read as corrected below.

Column 3, line 30, strike out "the surface of the die cavity whereby to smooth" and insert instead -- bores 60 which receive the pins that are used in --; column 6, line 27, for "1,960,577" read -- 1,960,557 --.

Signed and sealed this 22nd day of October 1968.

(SEAL)
Attest:

Edward M. Fletcher, Jr.                  EDWARD J. BRENNER
Attesting Officer                       Commissioner of Patents